(12) United States Patent
Bartelt et al.

(10) Patent No.: US 11,679,353 B2
(45) Date of Patent: Jun. 20, 2023

(54) SEPARATING DEVICE FOR SEPARATING A FLUID FROM GAS AS WELL AS SEPARATING ELEMENT AND COUPLING ELEMENT FOR SUCH A SEPARATING DEVICE

(71) Applicant: MANN+HUMMEL GmbH, Ludwigsburg (DE)

(72) Inventors: Bertram Bartelt, Steinheim (DE); Klemens Dworatzek, Edingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/516,333

(22) Filed: Nov. 1, 2021

(65) Prior Publication Data
US 2022/0118395 A1 Apr. 21, 2022

Related U.S. Application Data

(63) Continuation of application No. 15/905,296, filed on Feb. 26, 2018, now Pat. No. 11,161,071.

(30) Foreign Application Priority Data

Feb. 28, 2017 (DE) ...................... 10 2017 001 854.5

(51) Int. Cl.
*B01D 46/60* (2022.01)
*B01D 46/00* (2022.01)
*B01D 46/24* (2006.01)

(52) U.S. Cl.
CPC .......... *B01D 46/60* (2022.01); *B01D 46/001* (2013.01); *B01D 46/0005* (2013.01);
(Continued)

(58) Field of Classification Search
CPC .. B01D 46/60; B01D 46/0005; B01D 46/001; B01D 46/0015; B01D 46/0031;
(Continued)

(56) References Cited

U.S. PATENT DOCUMENTS 4,632,682 A * 12/1986 Erdmannsdorfer .......................... B01D 46/2414 55/504
5,803,715 A * 9/1998 Kitchener ............... F04B 39/16 417/313

(Continued)

*Primary Examiner* — Christopher P Jones
*Assistant Examiner* — Phillip Y Shao

(57) ABSTRACT

A separating device for separating a liquid from gas is provided with a separating element that has a housing with housing cover closing off an end face of the housing. A filter element is arranged in the housing. A coupling element is provided to couple the separating element to a connector device. The housing cover has a central first gas passage and a second gas passage arranged radially outwardly of the first gas passage. The housing cover has a housing cover thread correlated with the first gas passage. The housing cover thread is to be screwed to a coupling element thread of the coupling element. A fluid discharge channel is arranged within the coupling element for discharging separated liquid from the separating device. The housing cover thread and the coupling element thread, in a position of use of the separating device, are connected substantially seal-tightly to each other.

12 Claims, 9 Drawing Sheets

(52) U.S. Cl.
CPC ..... *B01D 46/0015* (2013.01); *B01D 46/0031* (2013.01); *B01D 46/2411* (2013.01)

(58) Field of Classification Search
CPC .... B01D 46/2411; B01D 45/02; B01D 46/00; B01D 50/20; B01D 51/02; F16L 19/0206
See application file for complete search history.

(56) References Cited

U.S. PATENT DOCUMENTS

| | | | | |
|---|---|---|---|---|
| 5,897,676 | A * | 4/1999 | Engel | B01D 46/0043 55/498 |
| 6,962,615 | B2 * | 11/2005 | Staudenmayer | B01D 39/2041 55/501 |
| 7,008,472 | B2 * | 3/2006 | Fornof | B01D 46/2411 55/315 |
| 7,682,508 | B2 * | 3/2010 | Girondi | B01D 35/153 210/248 |
| 8,025,708 | B2 * | 9/2011 | Heikamp | B01D 46/2411 55/501 |
| 8,920,530 | B2 * | 12/2014 | Ruhland | B01D 46/521 210/450 |
| 9,248,393 | B2 * | 2/2016 | Dworatzek | B01D 46/2414 |
| 2007/0209992 | A1 * | 9/2007 | Johnson | B01D 27/08 210/232 |
| 2010/0000412 | A1 * | 1/2010 | Heikamp | B01D 46/2411 96/189 |
| 2012/0167534 | A1 * | 7/2012 | Munkel | B01D 46/2414 55/423 |
| 2015/0101293 | A1 * | 4/2015 | Dworatzek | B01D 46/2414 55/423 |
| 2016/0030870 | A1 * | 2/2016 | Schmelzle | B01D 46/0031 285/119 |

* cited by examiner

SEPARATING DEVICE FOR SEPARATING A FLUID FROM GAS AS WELL AS SEPARATING ELEMENT AND COUPLING ELEMENT FOR SUCH A SEPARATING DEVICE

CROSS-REFERENCE TO RELATED APPLICATIONS

This application is a continuation application of U.S. application Ser. No. 15/905,296 having a US filing date of 26 Feb. 2018 and which claims a priority date of 27 Feb. 2017 based on prior filed German patent application No. 10 2017 001 854.5, the entire contents of the aforesaid US application and the aforesaid German patent application being incorporated herein by reference to the fullest extent permitted by the law.

TECHNICAL FIELD

The invention concerns a separating device for separating at least one fluid, in particular aerosol formed of liquid, wherein the liquid can be, for example, oil, fuel, hydraulic liquid or coolant, from gas, in particular from air, of a connector device, in particular of a compressor, of a compressed air device, or of a vacuum pump. This separating device has
 at least one fluid discharge channel for discharging the separated fluid from the separating device,
 at least one coupling element embodied for coupling a separating element of the separating device with the connector device, and
 a separating element with a housing with at least one filter element arranged therein and with a housing cover for closing off an end face of the housing.
This housing cover has
 at least a first gas passage, in particular at least one clean air outlet, that is arranged, in relation to a mounting axis of the housing, centrally at the connector device, in particular coaxially,
 a thread correlated with the first gas passage, wherein the thread of the housing cover is configured to be screwed onto a thread of the coupling element, and
 at least a second gas passage, in particular at least a raw air inlet, that is arranged, in relation to the mounting axis of the separating element, in radial direction outwardly of the first gas passage.

The present invention concerns moreover a separating element suitable for a separating device as defined above, comprising a housing with at least one filter element arranged in the housing for separating at least one liquid from gas, and a housing cover for closing off an end face of the housing, wherein the housing cover has at least a first gas passage which, in relation to a mounting axis of the separating element at a connector device, is arranged centrally, in particular coaxially; a thread correlated with the first gas passage, wherein the housing cover thread is embodied for screwing onto a thread of a coupling element embodied for connecting the separating element with the connector device; and at least a second gas passage that, in relation to the mounting axis of the separating element, is arranged radially outwardly of the first gas passage.

The invention also concerns a coupling element for coupling a separating element of a separating device embodied as described above with a connector device, wherein the separating device is configured for separating at least one liquid from gas and comprises at least one fluid discharge channel for discharging the separated liquid from the separating device, and the coupling element, in its position of use, extends through a first gas passage of the separating element, wherein this first gas passage of the separating element, in relation to a mounting axis of the separating element at the connector device, is centrally arranged and comprises a thread for screwing onto a thread of the coupling element.

BACKGROUND OF THE INVENTION

An air/oil separator box 300' of the prior art is illustrated in FIGS. 8, 9, and 10. The filter element 10', 20' of this air/oil separator box is embodied as an annular coalescing element that combines the fine oil droplets to larger oil drops that, due to the force of gravity, precipitate in downward direction in the filter element 10', 20' and downstream thereof. The separated oil collects in an annular groove 54' of a bottom end disk 50' of the filter element 10', 20'.

For coupling a separating element 100' of the air/oil separator box with a connector device, in particular with a compressor, a compressed air device, or a vacuum pump, the air/oil separator box comprises a coupling element 200', a so-called coupling pipe socket or nipple. The coupling pipe socket 200' extends through a first gas passage opening 32', i.e., through a central opening, of the housing cover 30' of the air/oil separator box. For discharging the purified air from the air/oil separator box 100', the coupling pipe socket 200' surrounds a clean fluid outlet pipe 210' with a gas-conducting interior. This clean fluid outlet pipe 210' projects into the interior of the filter element 10', 20' and extends through the first gas passage opening 32' to a connecting head of the coupling pipe socket which is arranged outside of the separating element 100' and is embodied for coupling the coupling element with the connector element.

For supply of the raw air to be purified, the housing cover 30' of the air/oil separator box 100' comprises a second gas passage 34' arranged, relative to the mounting axis 40' of the air/oil separator box 100', in radial direction outwardly of the first gas passage 32'. This second gas passage 34' is correlated with the raw side of the air/oil separator box.

For discharging the separated oil from the air/oil separator box 100', the coupling pipe socket 200' comprises a fluid discharge channel 220' which is extending from the interior of the separating element 100' to the connecting head of the coupling pipe socket. This fluid discharge channel 220' is arranged within the coupling pipe socket, i.e., between the tubular clean fluid outlet 210' and a radially outer circumferential side 230' of the coupling pipe socket 200' that surrounds the tubular clean fluid outlet 210'. In order for the separated oil to be retained up to the level of the fluid discharge channel 220' and able to enter the fluid discharge channel 220', a seal 320', i.e., an O-ring, is arranged between the bottom end disk 50' and the radially outer circumferential side 230' of the coupling pipe socket. This O-ring 320' seals the raw side of the air/oil separator box relative to the clean side of the air/oil separator box 100' and prevents that the oil drains between the area 36' of the housing cover 30' surrounding the central opening 32' of the housing cover 30' and the radially outer circumferential side 230' of the coupling pipe socket 200'. The O-ring thus has the function of retaining the oil so that it is discharged inside the coupling pipe socket, i.e., through the fluid discharge channel 220' between clean fluid outlet pipe 210' and the radially outer circumferential side 230' of the coupling pipe socket.

However, a disadvantage of this O-ring 320' is that mounting of the air/oil separator box is made difficult because the friction of the O-ring 320' must be overcome in order to engage the housing cover thread 36' with the thread 232' of the coupling pipe socket, when pushing on the housing 90'. This additional friction force which is required due to the O-ring 320' thus makes difficult the action of screwing on the housing cover thread 36'.

In order for the O-ring to be compressed seal-tightly between housing cover 30' and coupling pipe socket 200', the coupling pipe socket 200' must comprise a particularly carefully embodied sealing surface 240' at its circumferential side facing the O-ring. The sealing surface 240' however can wear over time when the air/oil separator box is in use.

When mounting the separating element 100', the housing cover 30' is guided across the radially outer circumferential side 230' of the coupling pipe socket until a thread 36' of the housing cover 30' contacts a thread 232' of the coupling pipe socket. In this context, the sealing surface 240' of the coupling pipe socket can become damaged.

Moreover, when mounting the separating element 100' on the coupling pipe socket 200', insertion of the O-ring 320' can be accidentally forgotten. Also, an O-ring 320' can be accidentally used that, with regard to material, is wrongly designed, for example, is not oil resistant.

When in the air/oil separator box that is illustrated in FIGS. 8 through 10 and is known from the prior art, the O-ring 320' is not compressed seal-tightly between the bottom end disk 50' and the coupling pipe socket 200', already separated oil is reintroduced into the air stream. A so-called re-entrainment occurs. This re-entrainment occurs when already separated oil can flow through between the radially inner area of the bottom end disk 50' and the radially outer circumferential side 230' of the coupling pipe socket 220', then flows past a damping ring 80' which is arranged between the annular groove 54' of the bottom end disk 50' and the housing cover 30', and collects between the bottom end disk 50' and the housing cover 30'. Incoming raw air flowing in through the second gas passage 34' of the air/oil separator box flows through the oil collected between the bottom end disk 50' and the housing cover 30', entrains a portion of the oil, flows past the damping ring 80', flows through the leaky area between the radially inner rim of the bottom end disk 50' and the coupling element 200', and in this way carries the already separated oil into the interior of the filter element 10', 20' and to the clean side of the air/oil separator box.

The damping ring 80' which is known from the prior art serves to dampen rattling noises. Rattling noises can be produced when the spring which is installed as a tolerance compensation for the separating element 100' is excited by mechanical vibration. Through the spring, temporarily a brief lifting off of the bottom end disk 50' from the housing cover 30' may occur so that the separating element 100' with the bottom end disk 50' swings back and forth axially in the housing, wherein a rattling noise is produced when the bottom end disk 50' contacts the housing cover 30'. This damping ring 80' is also referred to as rattling guard. The damping ring 80' which is arranged between the bottom end disk 50' and the housing cover 30' is made of a simple elastomer and has a height or axial extension in the range of tenth millimeter. Since due to this damping ring 80' the raw side of the air/oil separator box is not sealed from the clean side of the air/oil separator box, the O-ring 320' must be arranged between the bottom end disk 50' and the coupling pipe socket 200' in the air/oil separator box illustrated in FIGS. 8 through 10.

The O-ring 320' known from the prior art for sealing the raw side of the air/oil separator box relative to the clean side of the air/oil separator box has however the following disadvantages:
- the O-ring can be damaged upon installation;
- the O-ring interacts with a sealing surface on the coupling pipe socket 200'; this sealing surface on the coupling pipe socket 200' may become damaged and, as a lifetime component, is subject to minimal wear that can however still lead to leaks;
- in order to ensure the sealing function, a minimum compression of the O-ring is required which leads to an increased tightening and loosening torque;
- the O-ring itself can change during the course of operation such that the sealing action is no longer ensured; and
- as a function-relevant component, the O-ring requires particular care in regard to construction and production.

Air/oil separator boxes which have no O-ring for sealing the bottom end disk relative to the coupling element are known from the prior art. However, in these air/oil separator boxes, the oil discharge is not realized inside the coupling element but through the housing cover, for example, through the first gas outlet of the housing cover, for example, between the housing cover and the coupling element.

A separating device of the aforementioned kind, i.e., an air/oil separator box, is disclosed in the publication DE 10 2015 007 899 A1. In this air/oil separator box, the separated oil flows out of the air/oil separator box through a fluid discharge channel (see FIGS. 1 and 2, reference characters 36, 48, 64 of DE 10 2015 007 899 A1) that is arranged between the housing cover and the coupling element. This fluid discharge channel is provided by grooves which are milled into the thread of the housing cover. The oil discharge is thus realized through the thread of the housing cover.

The publication EP 2 762 219 A1 discloses an air/oil separator box in which the oil discharge is realized through the thread of the coupling element, i.e., through grooves which are milled into the thread of the coupling element (see FIG. 6, reference character 28, of EP 2 762 219 A1).

FIG. 10 of the publication EP 2 762 219 A1 discloses an embodiment in which the thread of the housing cover and the thread of the coupling element each are embodied continuously and the fluid discharge channel is provided by at least one through bore of the housing cover that is arranged at a spacing to the thread (reference character 280 of FIG. 10 of the publication EP 2 762 219 A1).

SUMMARY OF THE INVENTION

Starting from the afore described disadvantages and flaws as well as in appreciation of the discussed prior art, the present invention has the object to further develop a separating device of the aforementioned kind, a separating element of the aforementioned kind, as well as a coupling element of the aforementioned kind in such a way that the potential malfunctions of the separating device, in particular of the separating element, are precluded and mounting of the separating element in the separating device is facilitated.

This object is solved by a separating device characterized in that the housing cover thread and the coupling element thread, in position of use of the separating device, are connected substantially seal-tightly to each other, and in that the fluid discharge channel is arranged within the coupling element.

This object is further solved by a separating element characterized in that the first gas passage and the second gas passage are the only openings of the housing cover and the housing cover is otherwise completely closed, and in that the housing cover thread is embodied for substantially seal-tight engagement with the coupling element thread.

This object is further solved by a coupling element characterized in that the coupling element thread is configured for seal-tight engagement with the housing cover thread and in that the fluid discharge channel is arranged within the coupling element.

Advantageous embodiments and expedient further developments of the present invention are characterized in the respective dependent claims.

The separating device serves for separating at least one liquid from gas which is supplied from a connector device. The purified gas and the separated liquid are also discharged again through the connector device. The separating device comprises at least one fluid discharge channel which is embodied for discharging the separated liquid from the separating device; at least one coupling element which is embodied for coupling a separating element of the separating device with the connector device and is generally also referred to as coupling nipple and in general, once mounted on the connector device, remains thereon; a separating element with a housing and at least one coalescing filter element (for short: filter element) arranged therein and a housing cover embodied for closing off an end face of the housing. The housing cover is provided with at least one first gas passage, which in relation to a mounting axis of the separating element at the connector device, is arranged centrally, in particular coaxially; with a thread correlated with the first gas passage, wherein this housing cover thread is configured to be screwed onto a thread of the coupling element; and with at least a second gas passage which, in relation to the mounting axis of the separating element, is arranged in radial direction outwardly of the first gas passage. In the filter element, a plurality of layers of a coalescing filter medium, for example, a glass fiber paper, wound to rest on each other, are arranged in which small liquid droplets are combined to larger drops and, due to the force of gravity, drain downwardly in the direction toward the liquid outlet.

Accordingly, the invention is based on the fastening thread, comprised of the housing cover thread and the coupling element thread, of the separating device being seal-tight or fluid-impermeable, in particular substantially liquid-impermeable. The fastening thread and the housing cover thread for this purpose are in particular uninterrupted, i.e., the threads comprise a plurality of complete and uninterrupted thread turns. Because the thread of the housing cover is embodied in this way in particular for sealing or for seal-tight engagement of the thread of the coupling element, i.e., is seal-tightly connectable with the thread of the coupling element, in the present invention the housing cover is seal-tightly connectable without additional sealing element, in particular without the O-ring 320' (compare FIGS. 8 through 10) known from the prior art, with the coupling element. Liquid drainage through the fastening thread of the separating device is reliably prevented. Thus, the separated liquid must drain radially within the fastening thread of the separating device, i.e., within the coupling element arranged within the first gas passage. In the separating element according to the present invention, the fluid discharge channel, in relation to the mounting axis of the separating element, is thus arranged in radial direction inward of the housing cover thread or in radial direction inward of the coupling element thread. Accordingly, the liquid drainage is realized within the coupling element, for example, through at least one annular discharge channel which is arranged within the coupling element.

In order to prevent liquid drainage through the housing cover, the housing cover is completely closed or completely seal-tight between the thread of the housing cover and the second gas passage of the housing cover. The second gas passage, for example, provided at the raw side, and the bore of the thread of the housing cover are the only openings of the cover. There is thus no additional opening between the thread of the housing cover and the second gas passage of the housing cover.

In an advantageous embodiment of the separating element of the present invention, the first gas passage of the housing cover is cylinder-shaped. The housing cover thread comprises at least one thread turn that winds continuously helix-like about the jacket of the cylinder-shaped first gas passage of the housing cover and is completely closed. Aside from the at least one thread turn embodied for seal-tight engagement or for sealing engagement in the coupling element thread, the housing cover thread is thus free of cuts or interruptions. The thread of the housing cover is thus embodied so as to extend completely circularly in circumferential direction and without radial cuts or interruptions in relation to the mounting axis of the separating element. This closed configuration of the thread turn of the housing cover thread enables a substantially seal-tight or substantially sealing engagement of the housing cover thread in the coupling element thread or with the coupling element thread.

The screw-in depth of the housing cover thread amounts advantageously to at least one third of the diameter of the first gas passage. In other words, the profile height of the housing cover thread that is coaxially extending in relation to the mounting axis of the separating element amounts advantageously to at least one third of the diameter of the first gas passage. With this minimum screw-in depth or minimum profile height of the housing cover thread, a good sealing action of the housing cover thread can be provided.

The housing cover thread is advantageously of high-strength metal, in particular of steel of high strength, for example of unalloyed quality steel according to DIN EN 10020.

In order to provide an engagement as seal-tight as possible between the housing cover thread and the coupling element thread, the housing cover thread and the coupling element thread are advantageously each embodied according to tolerance class medium (m) according to DIN ISO 965-1, in particular according to the tolerance class M39 according to DIN ISO 965-1, or according to the tolerance class fine (f) according to DIN ISO 965-1. The tolerance class defines how much of a gap exists between nut part and screw part, i.e., between the housing cover thread and the coupling element thread. In other words, the tolerance class defines with how much tolerance the thread flanks of the housing cover thread and of the coupling element thread are resting on each other.

The fineness, i.e., the number of turns per centimeter of profile height of the thread of the separating element, advantageously exhibits the highest thread quality.

For reinforcing the sealing action of the thread of the separating device, at least one thread sealing means can be arranged in the region of at least one thread turn of the housing cover thread and/or of the coupling element thread.

The housing cover thread can be an inner thread or an outer thread. In the embodiment illustrated in FIGS. 1 through 7, the housing cover thread is an inner thread and the coupling element thread is an outer thread.

In an advantageous embodiment of the separating element of the present invention, the filter element has two end faces that are positioned opposite each other and extend radially relative to the mounting axis of the separating element. The end face which is facing the housing cover is delimited by a first end disk. The opposite end face is delimited by a further end disk which is facing away from the housing cover. The first end disk comprises a through opening for passing the coupling element therethrough. This through opening is correlated with the first gas passage and is surrounded by a rim area of the first end disk that is radially inwardly positioned in relation to the mounting axis of the separating element. This radially inner rim area of the first end disk is in particular additionally advantageously embodied or designed as an inner support contour which serves for supporting or guiding the coupling element during mounting. In the position of use, the through opening is preferably arranged above and axially spaced from the coupling element thread and surrounds a cylindrical area of the coupling element that is not provided with a thread and extends axially away from the area provided with the thread into the interior of the filter element.

The coupling element comprises at least one gas-conducting interior, in particular a clean fluid outlet pipe which, in the position of use of the separating device, extends through the through opening of the first end disk.

In an advantageous embodiment, the filter element comprises an end face which, in relation to the mounting axis of the separating element, extends radially and is facing the housing cover and which is delimited by a first end disk. This first end disk is also referred to as open end disk and comprises preferably a through opening configured for passing through the coupling element and correlated with the first gas passage, wherein the through opening is delimited by a rim area of the first end disk which is radially inwardly positioned in relation to the mounting axis of the separating element. Further preferred, the coupling element and the first end disk, in particular the coupling element and the through opening, in particular the coupling element and a radially inner, in particular circular, rim area, are without contact in the position of use of the separating device. Without contact means in this context that no direct contact between end disk and coupling element is existing, in particular no sealing contact by means of a seal, a sealing ring, or a contact sealing surface. In this way, mounting can be facilitated. Preferably, the coupling element and the first end disk are without contact in such a way that housing cover thread and interior of the filter element are fluidically connected, in particular with throttling action.

In order to reduce a liquid drainage through the through opening, in an advantageous embodiment of the separating device of the present invention the coupling element in the area of the through opening is arranged relative to the filter element such that the spacing between the circumferential wall of the coupling element, which is outwardly positioned in radial direction in relation to the mounting axis of the separating element, and the radially inner rim area of the first end disk amounts to at most 3 mm, preferably less than 2 mm, and particularly preferred less than 1 mm. This spacing can also be referred to as width of the gap that is formed thereat. In this way, locally a throttling effect is generated and the oil flow and gas exchange between the coupling nipple and the separating element is minimized in this way.

In order to substantially or completely prevent a liquid drainage through the through opening, in an advantageous embodiment of the separating device of the present invention the coupling element is arranged in the area of the through opening such in relation to the filter element that the spacing between the circumferential wall of the coupling element, that is positioned in radial direction outwardly in relation to the mounting axis of the separating element, and the radially inner rim area of the first end disk amounts to at most one percent of the diameter, in particular at most one percent of the radius, of the radially outer circumferential wall of the coupling element that is arranged in the through opening in the position of use.

The radially outer circumferential wall of the coupling element that is arranged in the position of use in the through opening is advantageously embodied as a sealing surface.

Independent thereof or in connection therewith, in an advantageous embodiment the spacing between the circumferential wall of the coupling element, that is positioned in radial direction outwardly in relation to the mounting axis of the separating element, and the radially inner rim area of the first end disk amounts to at least 0.1 mm. This minimum spacing of 0.1 mm facilitates the insertion of the coupling element into the through opening when mounting the separating device.

Moreover, the separating element of the present invention can comprise in addition a labyrinth sealing element in order to prevent a liquid drainage through the through opening. The coupling element, in the position of use of the separating element, extends through the first gas passage and this labyrinth sealing element is embodied to interact with the coupling element like a labyrinth seal in such a way that a gap of the through opening between the first end disk and the coupling element is substantially fluid-impermeable or fluid-permeable only with throttling action.

For providing a labyrinth seal, the inner rim area of the first end disk may comprise at least one stay element, in particular a first collar, that surrounds the through opening and extends, in relation to the mounting axis of the separating element, inwardly in radial direction, and at least one further stay element that surrounds the through opening and extends, in relation to the mounting axis of the separating element, inwardly in radial direction. These stay elements which are embodied as labyrinth sealing elements are arranged, relative to the mounting axis of the separating element, axially displaced to each other such that they form at least one fluid retaining chamber in the position of use of the separating element. This fluid retaining chamber is configured to retain and collect the liquid which is separated by the filter element and flows into the through opening. The first stay element and the additional stay element are thus configured to interact with the coupling element that is extending through the through opening in the position of use of the separating element, like a labyrinth seal in such a way that the gap of the through opening is substantially fluid-impermeable.

In this context, labyrinth seal is to be understood as a contact-free seal. The sealing action is based on an extension of the flow path through the gap to be sealed so that the flow resistance is significantly increased. This extension of the flow path is realized in an advantageous embodiment of the separating element of the present invention by an alternating arrangement of at least two stay elements surrounding the first gas passage which, without contact, interact with the coupling element arranged in the first gas passage. In this way, the stay elements can provide a compartmentation for dividing the gap to be sealed of the first gas passage. Due to the high flow resistance in the gap of the first gas passage arranged between the coupling element and the separating element, only a minimal tolerable fluid quantity can exit through the labyrinth seal.

The throttled fluid-permeable constriction without contact that is in particular embodied as a labyrinth seal between first end disk and coupling element enables advantageously adjacently, above the thread connection of the fastening thread, a fluidic relief of the thread connection, i.e., the constriction contributes to minimizing a leakage flow, also called by-pass. However, should a leakage flow occur through the fastening thread into the interior of the filter element in case of certain operating conditions, there is the risk that liquid that collects above the fastening thread is entrained in the form of droplets. The constriction, or the gap or the labyrinth seal, provide in such situations a throttle which can reduce this effect.

In order to prevent transfer of fluid from the second gas passage to the first gas passage by bypassing the filter element, the separating element, aside from the housing cover thread embodied for seal-tight engagement in the coupling element thread and the optional labyrinth sealing element, can comprise in addition at least one sealing and damping element that is compressed sealingly between the filter element, in particular between the first end disk, and the inner side of the housing cover that is facing the interior of the separating element. In this advantageous embodiment of the separating element of the present invention, the sealing and damping element is configured to seal a clean side of the separating element from a raw side of the separating element that contains unpurified fluid, and dampen in relation to the mounting axis of the separating element axially oriented vibrations of the separating element.

This sealing and damping element can be coaxially seal-tightly compressed in relation to the mounting axis of the separating element, for example, between the first end disk, in particular between at least one projection extending axially in the direction toward the housing cover, for example, between at least one vertical stay or at least one annular groove, of the first end disk and the housing cover.

As an alternative to an axial compression of the sealing and damping element, the sealing and damping element can also be compressed radially relative to the mounting axis of the separating element between the first end disk, in particular between at least one projection extending axially in the direction toward the housing cover, for example, between at least one vertical stay or at least one annular groove, of the first end disk and the housing cover.

Advantageously, the sealing and damping element is axially compressed between the first end disk and the housing cover in such a way that the sealing and damping element can withstand the pressure between raw side and clean side.

The axial or coaxial extension or height or thickness of the sealing and damping element in relation to the mounting axis of the separating element amounts advantageously to at least one millimeter, in particular at least two millimeters, for example, at least three millimeters.

The sealing and damping element is advantageously made of at least one material that exhibits a temperature resistance of more than 100 degrees C. as well as a long-term oil resistance, in particular an oil resistance according to DIN EN 60811-2-1.

The sealing and damping element is thus advantageously of material with simultaneously high thermal resistance and high chemical resistance, in particular high oil resistance.

For example, the sealing and damping element can be comprised substantially of at least one fluoroelastomer, for example, of fluororubber (FKM), for example, of FKM with 60-80 Shore A, or of fluorocarbon rubber and/or of at least one rubber material, for example, of at least one peroxide-crosslinked rubber material, for example, hydrogenated acrylonitrile butadiene rubber (HNBR).

The present invention concerns moreover the use of at least one separating element according to the afore described kind and/or a coupling element according to the afore described kind in a separating device, in particular in an oil separator, for example, an air/oil separator box, for purifying the exhaust of a compressor, of a compressed air device, or of a vacuum pump.

BRIEF DESCRIPTION OF THE DRAWINGS

As already described above, there are various possibilities to configure and further develop the teaching of the present invention in an advantageous way. For this purpose, on the one hand, reference is being had to the dependent claims; on the other hand, further configurations, features, and advantages of the present invention will be explained in more detail inter alia with the aid of the embodiments illustrated in FIGS. 1 through 7.

Same or similar configurations, elements or features are identified in the FIGS. 1 through 10 with identical reference characters.

DETAILED DESCRIPTION

In FIG. 1 through FIG. 7, a separating device, i.e., an air/oil separator device 300, is illustrated in different illustrations, section views, and detail views. The air/oil separator device 300 serves for separating oil possibly entrained in air from the air. The air/oil separator device 300 is used, for example, in connection with compressors, vacuum pumps, compressed air devices or the like. It can be arranged upstream of an inlet or downstream of an outlet of a corresponding device.

Figure 3:
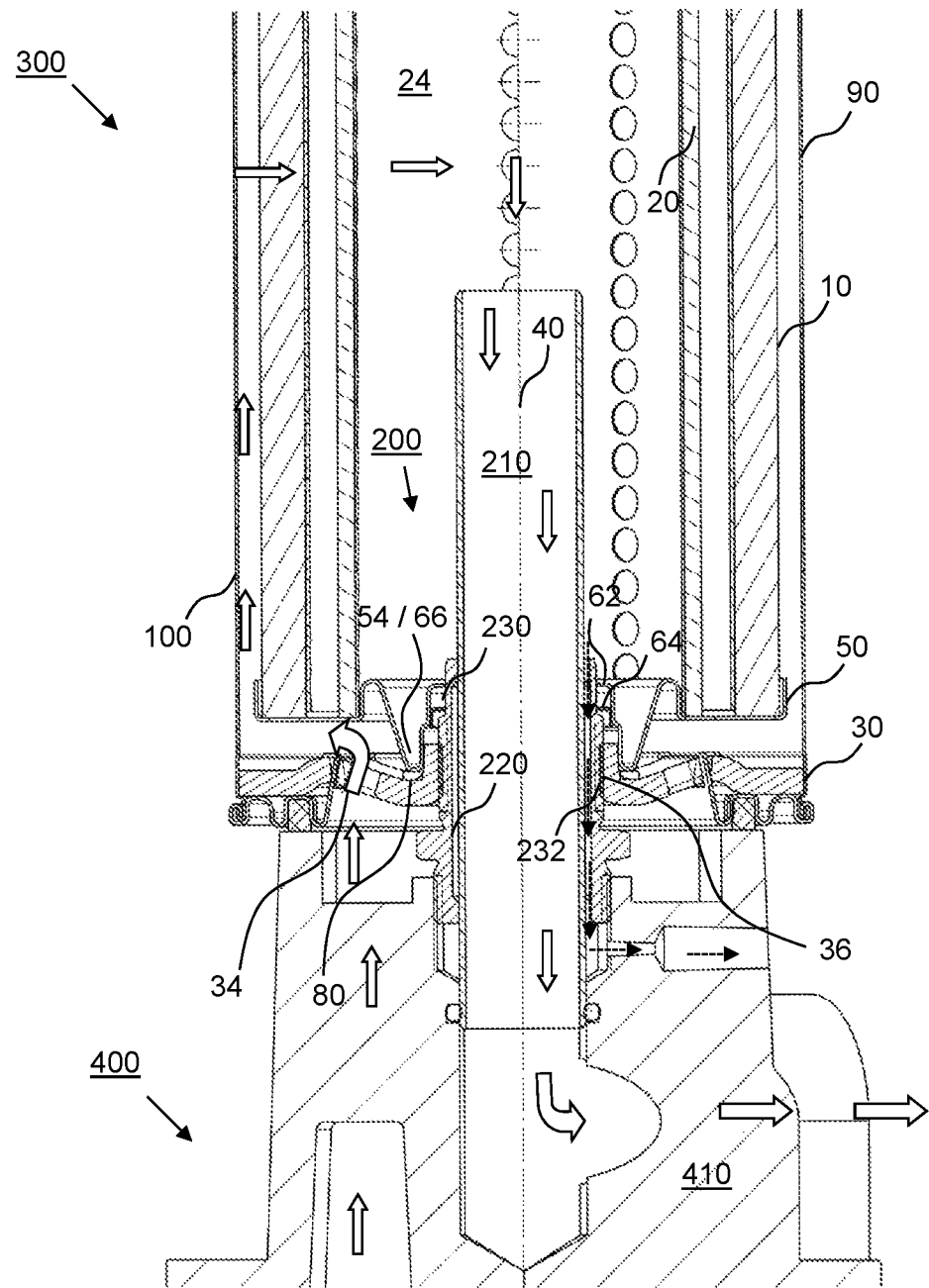
FIG. 3 shows in longitudinal section illustration a detail view of the separating device of FIG. 1, wherein this separating device is coupled with a connector element.

The air/oil separator device 300 comprises a separating element 100 that is also referred to as air/oil separator box. The separating element 100 is exchangeably attached to a connector head 410, in FIG. 3 at the bottom. The connector head 410 serves as a connector device for corresponding air conduits and oil conduits for connection with the corresponding device. In FIG. 3, the connector head 410 is only schematically illustrated.

A coupling element 200, i.e., a hollow, pipe socket-type coupling nipple, connects the separating element 100 with the connector head 410. For discharging the purified air from the air/oil separator device 300, the coupling pipe socket 200 surrounds a clean fluid outlet pipe 210 with an air-conducting interior.

The air/oil separator element 100 comprises a cup-shaped housing 90. In the housing 90, for example, a filter element 10, 20 embodied as an annular coalescing element is arranged. As filter medium, the filter element 10, 20 comprises, for example, a glass fiber mat 10 which is wound several times in an annular shape and is delimited at the end faces by a top end disk 52 and a bottom end disc 50 facing the connector head 410. As a further filter medium 20, a nonwoven is arranged in the interior of the glass fiber coil.

The opening of the housing 90 which is facing the connector element 400 is closed off by a housing cover 30.

The clean fluid outlet pipe 210 projects into the interior of the filter element 10, 20 and extends through a central clean air outlet opening 32 of the housing cover to a connecting head of the coupling pipe socket 200 which is arranged outside of the separating element 100 and embodied for connecting the coupling nipple 200 to the connector head 410 of the connector element 400.

For supply of the raw air to be purified, the housing cover comprises a second gas passage 34 which, in relation to the mounting axis 40 of the air/oil separator device 300, is arranged radially outwardly of the clean air outlet opening 32. This second gas passage 34 is correlated with the raw side of the air/oil separator box.

For discharging the separated oil from the air/oil separator box 100, the coupling nipple 200 comprises a fluid discharge channel 220 which is extending from the interior of the separating element 100 to the connecting head of the coupling nipple. This fluid discharge channel 220 is arranged inside the coupling nipple, i.e., between the tubular clean fluid outlet 210 and a radially outer circumferential side 230 of the coupling nipple 200 which surrounds the tubular clean fluid outlet 210.

The flow path of the air in the air/oil separator device 300 is illustrated in FIG. 3 by means of block arrows. Raw air flows through the raw air inlet 34 into the housing, flows laterally along the filter element 10, 20, and flows through it from the exterior to the interior. The oil which is separated in the filter element 10, 20 collects in an annular groove 54 of the bottom end disk 50 to a defined level, then flows into the fluid discharge channel 220 between clean fluid outlet 210 and an area of the coupling nipple 200 surrounding the clean fluid outlet 210, and is then discharged. The flow path of the fluid in the air/oil separator device 300 is illustrated in FIG. 3 by means of dashed arrows.

Figures 4, 5:
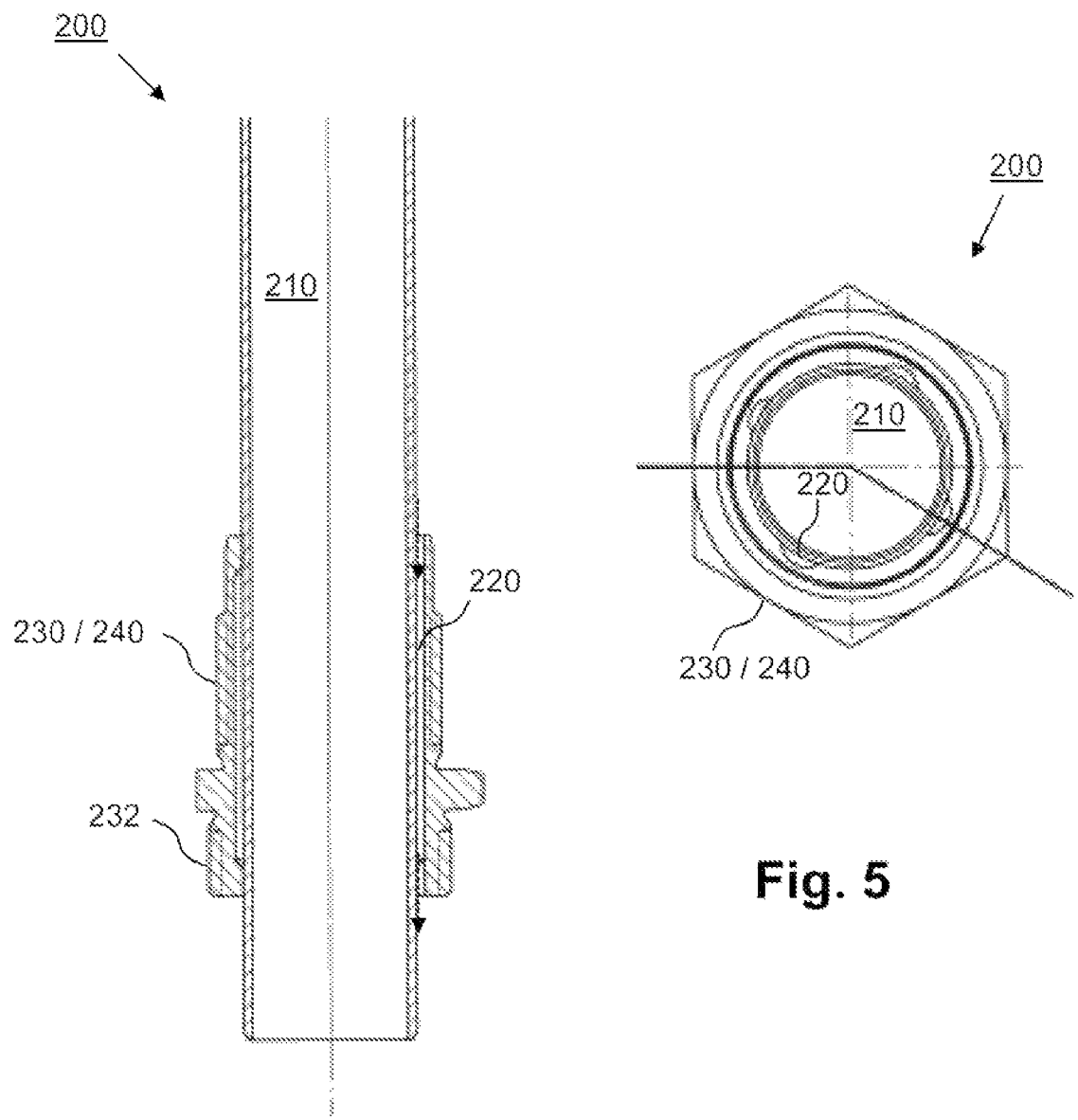
FIG. 4 shows in longitudinal section illustration the coupling element of FIG. 1.
FIG. 5 shows in cross section illustration the coupling element of FIG. 1.

In FIG. 4, the flow path of the fluid in the fluid discharge channel 220 of the coupling nipple 200 is illustrated by means of dashed arrows.

Figure 1:
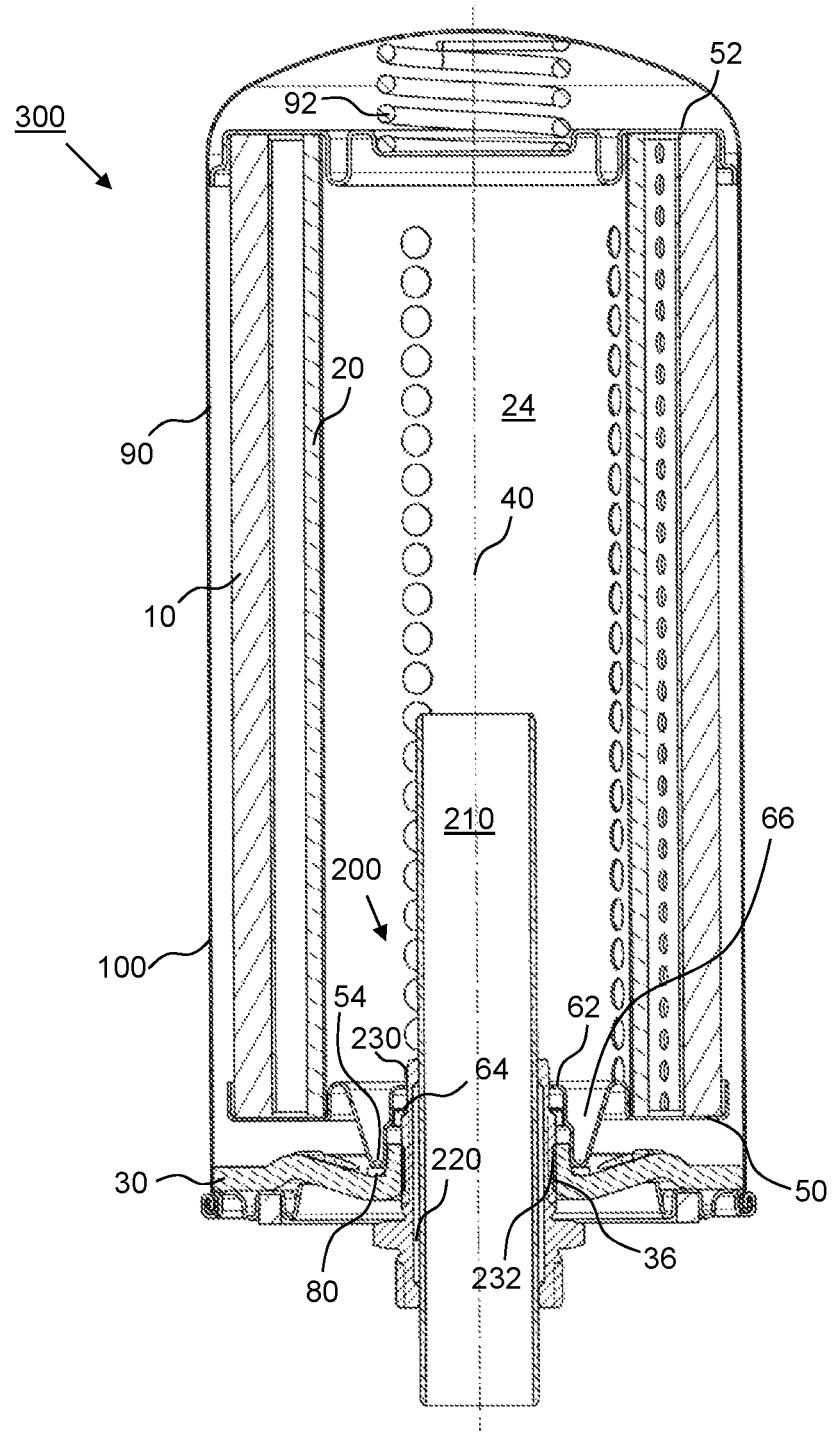
FIG. 1 shows in longitudinal section illustration an embodiment of a separating device according to the present invention with an embodiment of a separating element according to the present invention and with an embodiment of a coupling element according to the present invention.

In general, the air/oil separator device 300 is arranged in operation-ready state in the orientation illustrated in FIG. 1 and FIG. 3. However, it can also be arranged in different orientations. When in the following bottom, top or the like is mentioned, this refers to the illustration in FIG. 1 and FIG. 3, if nothing else is mentioned.

The housing 90, the filter element 10, 20, and the coupling nipple 200 in the operation-ready mounted air/oil separator device 300 are each coaxial to an imaginary mounting axis 40. The air/oil separator element 100 can be screwed by means of coupling nipple 200 onto the connector head 410 and unscrewed therefrom about the mounting axis 40.

When in the following radial, axial, coaxial, or circumferential or the like is mentioned, this relates to the mounting axis 40, if nothing else is mentioned.

The bottom end disk 50 which is facing the housing cover 30 is approximately annular. It comprises a coaxial mounting opening or through opening 60 for the coupling nipple 200. Radially between the through opening 60 and the filter medium 10, 20 of the filter element, the bottom end disc 50 is bent several times so that a circumferential annular groove 54 results which is open toward the element interior 24 of the filter element 10, 20.

A radially inner collar 62 of the lower end disk 50 surrounds the through opening 60. It is pointing toward the coupling nipple 200 arranged in the through opening 60. In order to facilitate mounting of the separating element 100, the radially inner collar 62 of the bottom end disk 50 can be designed for support on the coupling nipple 200. In the advantageous embodiment illustrated in FIGS. 1 through 6, the radially extending inner collar 62 or the inner collar 62 which is extending in the direction toward the coupling nipple 200 serves for supporting the bottom end disk 50 on the outer circumferential side 230 of the coupling nipple 200. This is beneficial when during mounting of the separating element 100 the housing cover 30 is guided along the outer circumferential side 230 of the coupling nipple 200 until the thread 36 of the housing cover 30 contacts the thread 232 of the coupling nipple 200.

An inner diameter of the through opening 60 is greater than an outer diameter of the coupling nipple 200 at the through opening 60. Between the radially outer circumferential wall 230 of the coupling nipple 200 and the radially inner rim of the through opening 60 there remains an annular coaxial gap 272.

Figure 8:
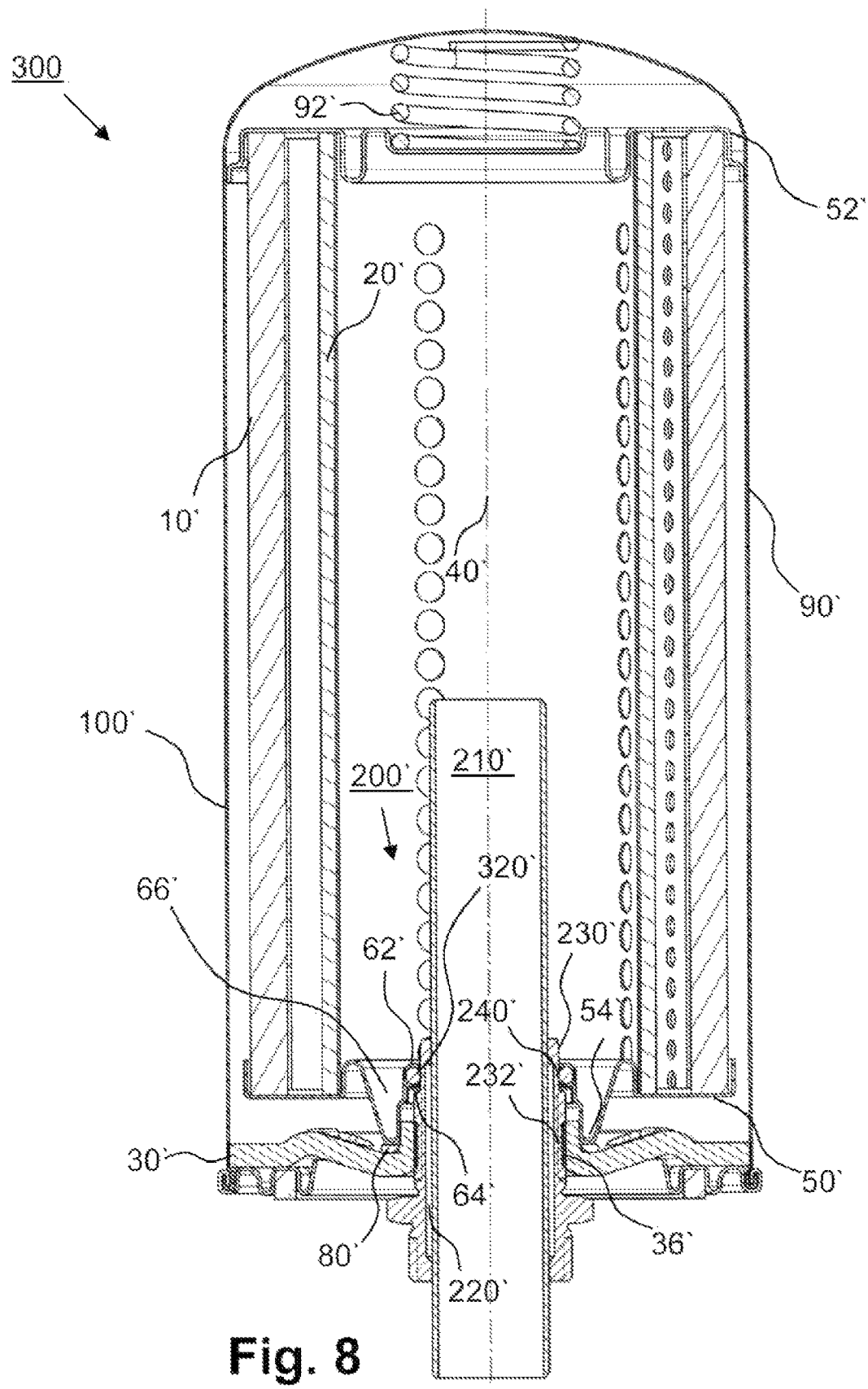
FIG. 8 shows in longitudinal section illustration a separating device of the prior art with a separating element of the prior art and a coupling element of the prior art.
Figure 9:
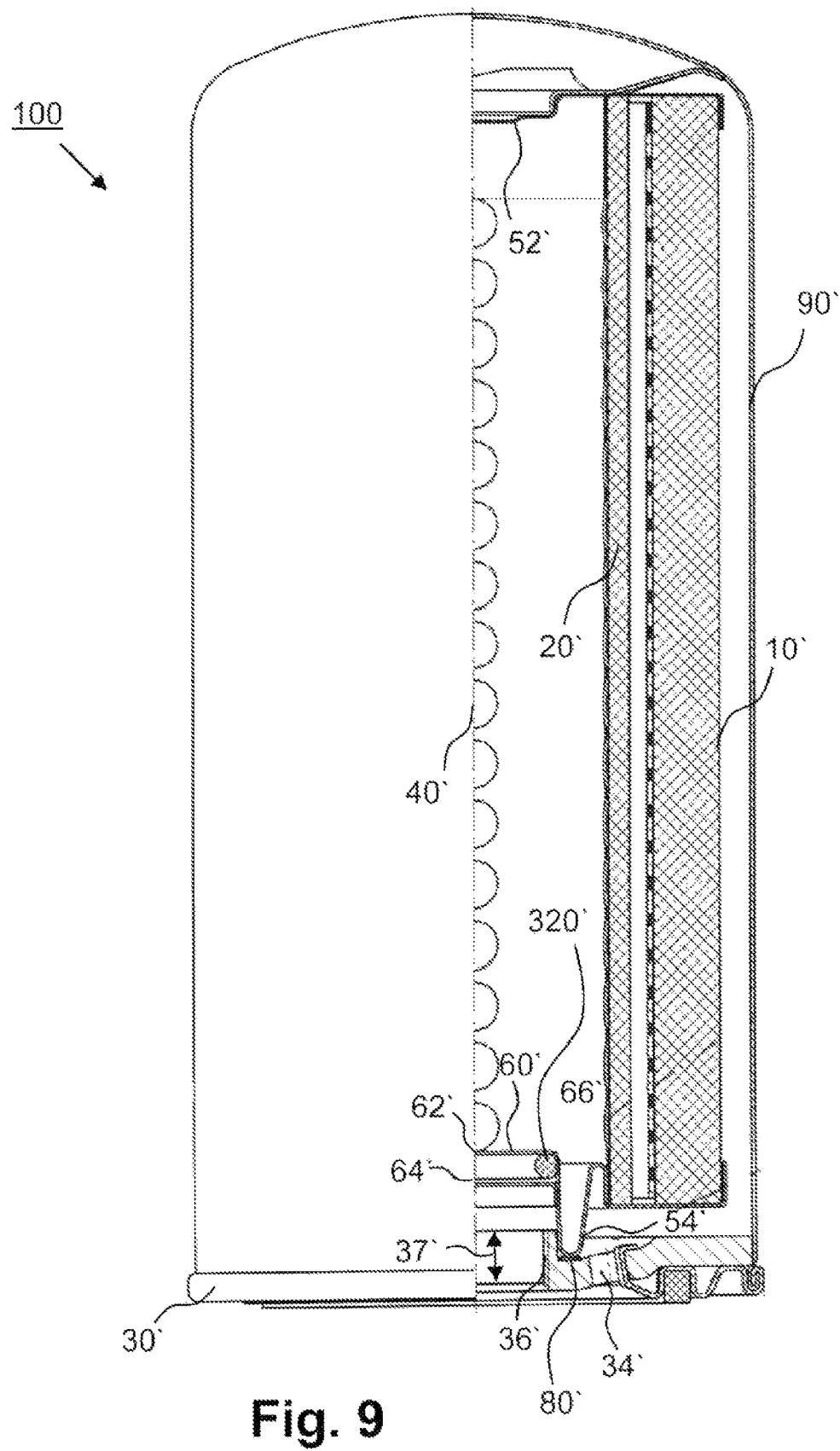
FIG. 9 shows in semi-isometric longitudinal section illustration the conventional separating element of FIG. 8.

In contrast to the separating device of the prior art which is illustrated in FIGS. 8 and 9 and described in the BACKGROUND section, the coaxial gap 272 is without sealing element in the present invention. The coaxial gap 272 is thus not sealed by means of a sealing ring 320' or O-ring known in the prior art and arranged between the bottom end disk 50' and the radially outer circumferential side 230' of the coupling nipple 200' (compare FIGS. 8 through 10).

Advantageously, the width of the coaxial gap 272 is less than 3 mm, preferably less than 2 mm, and particularly preferred less than 1 mm, in order to generate locally a throttling action and to thus minimize the oil flow and gas exchange between the coupling nipple 200 and the separating element 100.

In order to optimally minimize oil flow and gas exchange between the coupling nipple 200 and the separating element 100, the width of the coaxial gap 272 between the collar 62 of the bottom end disk 50 and the coupling nipple 200 arranged in the through opening 60 is at most one percent of the radius and preferably at most one percent of the diameter of the coupling nipple 200 which is arranged in the through opening 60. Exemplary diameters of the coupling nipple 200 are in a range of 10 mm to 50 mm, preferably in the range of 20 mm to 30 mm or up to 40 mm. Due to this adjustment, also a certain support action of the coupling nipple 200 is ensured so that mounting is facilitated.

Advantageously, the width of the coaxial gap 272 however does not amount to less than 0.1 mm because otherwise mounting would be made difficult.

In the prior art illustrated in FIGS. 8 through 10, the spacing of the radially inner collar 62 of the bottom end disc 50 to the coupling nipple 200 is not as tightly adjusted because below the collar 62 of the bottom end disk 50 the O-ring 320' is clamped and this O-ring 320' seals the gap 272 between the collar 62 of the lower end disk 50 and the coupling nipple 200.

At its center, the housing cover 30 comprises the coaxial clean air outlet opening 32. This clean air outlet opening 32 is configured for receiving the coupling nipple 200. A radially inner circumferential wall of the housing cover 30 surrounding the clean air outlet opening 32 is provided with an inner thread 36. The inner thread 36 matches a corresponding outer thread 232 provided on the radially outer circumferential side of the coupling nipple 200.

Only little of the oil that is collected in the annular groove 54 flows into the gap 272 between the bottom end disk 50 and the coupling nipple 200. The seal-tightness of the fastening thread of separating device 300 that is formed of the housing cover thread 36 and the coupling element thread 232 is so great that the oil, even without the O-ring 320' known from the prior art (compare FIGS. 8 through 10), collects and drains via the fluid discharge channel 220.

Figure 2:
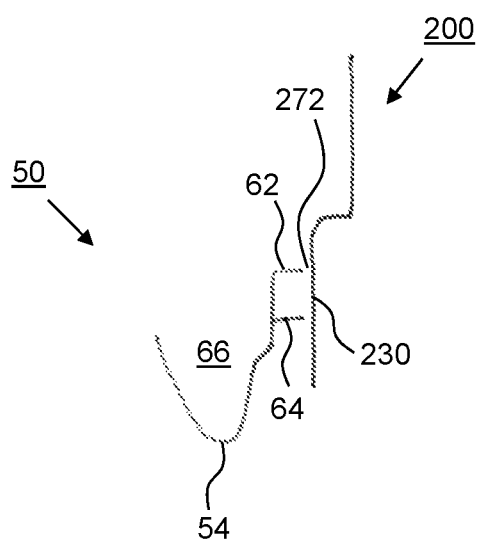
FIG. 2 shows in schematic illustration a detail view of the transition between a bottom end disk of the separating element of FIG. 1 which is facing the housing cover and the area of the radially outer circumferential wall of the coupling element of FIG. 1 which is facing the bottom end disk.

The groove or the chamber for receiving the O-ring 320' that is eliminated in the present invention can still be seen in FIGS. 1 to 3 at the location where it is located in the prior art. In FIGS. 1 to 3, a further stay element 64 can be seen that is, for example, separately welded on or soldered on. This further stay element 64 can now also be eliminated (compare FIG. 6) or can be used as an element of a labyrinth seal (compare FIGS. 1, 2, 3, and 7).

A labyrinth seal, for example, a spoke-type labyrinth seal, can be realized by an edge which is arranged below the collar 62 of the first end disk 50, for example, by the additional stay element 64. In this way, pressure drop is realized across the spoke-type labyrinth or the compartmentation of the labyrinth seal and then again by means of the individual thread turns of the fastening thread 36, 232 of the separating device 300. The thread turns of the fastening thread 36, 232 act also like a labyrinth seal because they extend the flow path of the fluid through the clean air outlet opening 32 of the housing cover 30. As a whole, the fastening thread 36, 232 together with the collar 62, the further stay element 64, and the coupling nipple 200 arranged in the through opening 60 form a large labyrinth seal that ensures then a sufficient seal-tightness.

The longer the thread turns of the fastening thread 36, 232, the greater the gap 272 between the bottom end disk 50 and the coupling nipple 200 can be embodied, and vice versa.

The axial exterior side of the bottom end disk 50 that delimits the annular groove 54 projects past the filter medium 10, 20 in axial direction. A section of the exterior side of the bottom end disk 50 that forms the bottom of the annular groove 54 is positioned circumferentially continuously in axial direction at a sealing and damping element, i.e., at a sealing and damping ring 80. The sealing and damping ring 80 is supported at the axial opposite side on an inner side of the housing cover 30. The sealing and damping ring 80 is coaxial to the mounting axis 40. In the present invention, the sealing and damping ring 80 is embodied such that it separates the raw side of the air/oil separator element 100 from the clean side of the air/oil separator element 100. For this purpose, the sealing and damping ring 80 is seal-tightly compressed between the bottom end disk 50 and the housing cover 30. The sealing and damping ring 80 arranged between housing cover 30 and the bottom end disk 50 prevents that air from the raw fluid inlet flows through the gap 272 between the bottom end disk 50 and the coupling nipple 200 and from there into the oil collecting chamber of the annular groove 54 of the bottom end disc.

Moreover, the sealing and damping ring 80 serves for damping operation-caused vibrations or oscillations of the separating element 100 and prevents in this way that rattling noises are produced. Moreover, the sealing and damping ring 80 serves for tolerance compensation.

The separating device 300 illustrated in FIGS. 1 through 7 differs from the separating device 300' illustrated in FIGS. 8 and 9 in that the sealing and damping ring 80 is designed to take on the task of rattling guard as well as the task of separating raw and clean side. The O-ring 320' known in the prior art can be eliminated due to the appropriate modification of the construction. The resulting oil flow through the fastening thread 36, 232 can be reduced by corresponding constructive adjustment of the bottom end disk 50 relative to the coupling nipple 200 to such an extent that it is no longer relevant for the function.

In the embodiment of a separating element 100 of the present invention as illustrated in FIGS. 1 through 7, the damping element 80' known from the prior art therefore takes on additionally the sealing function of the O-ring 320' known from the prior art so that the latter can be eliminated. Without the O-ring 320' of the prior art, the separating element 100 can be more easily mounted in, and demounted from, the separating device 300.

Figure 6:
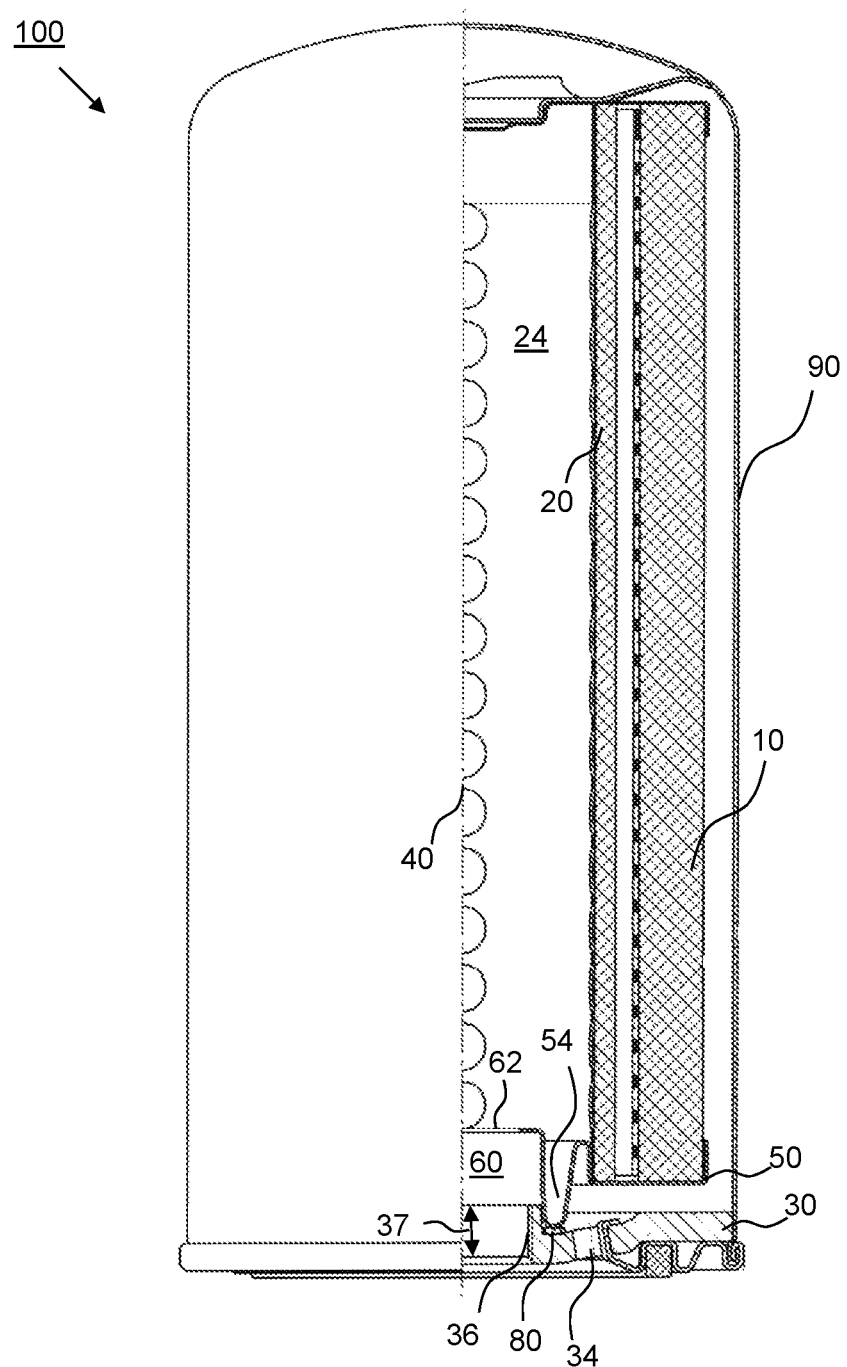
FIG. 6 shows in semi-isometric longitudinal section illustration the separating element of FIG. 1.
Figure 7:
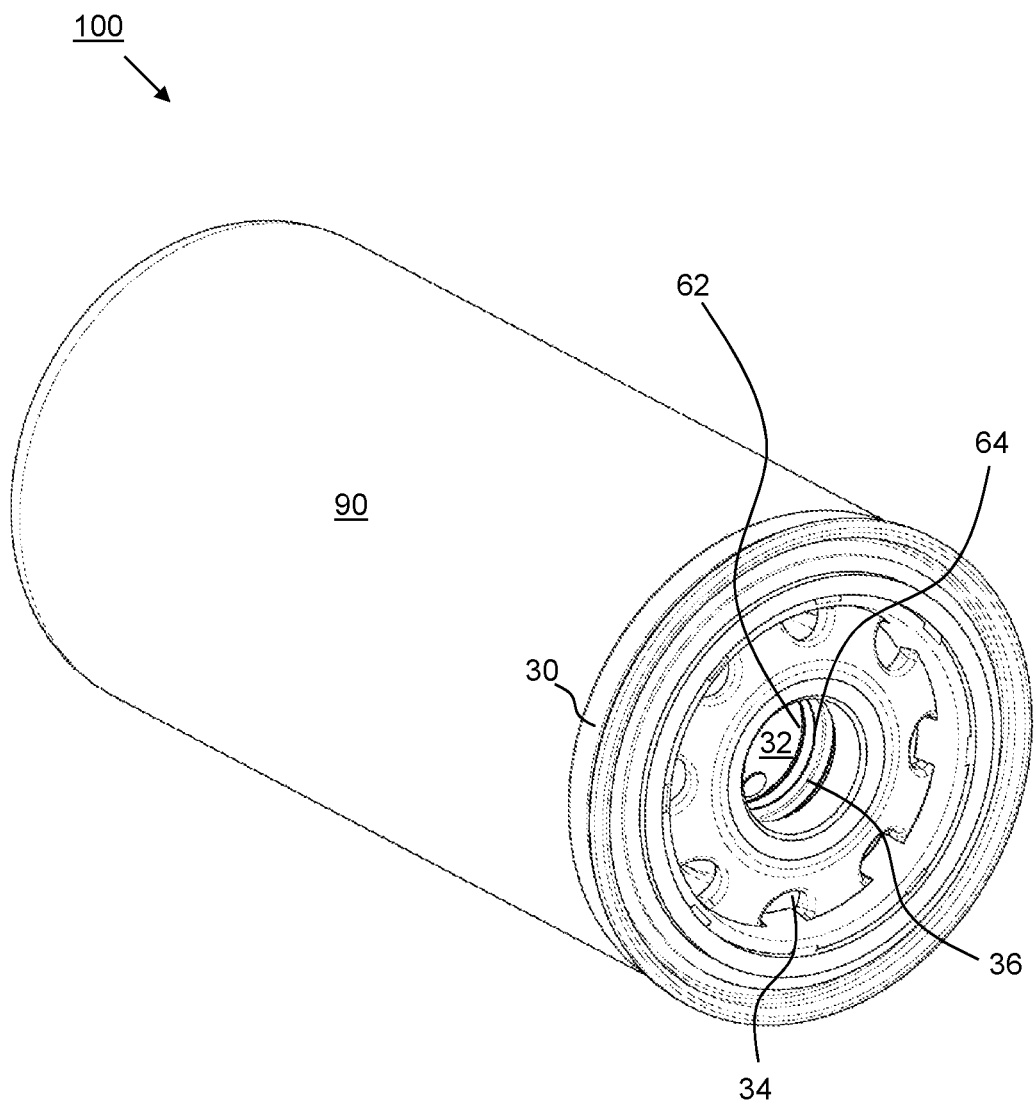
FIG. 7 shows in isometric illustration the separating element of FIG. 1.
Figure 10:
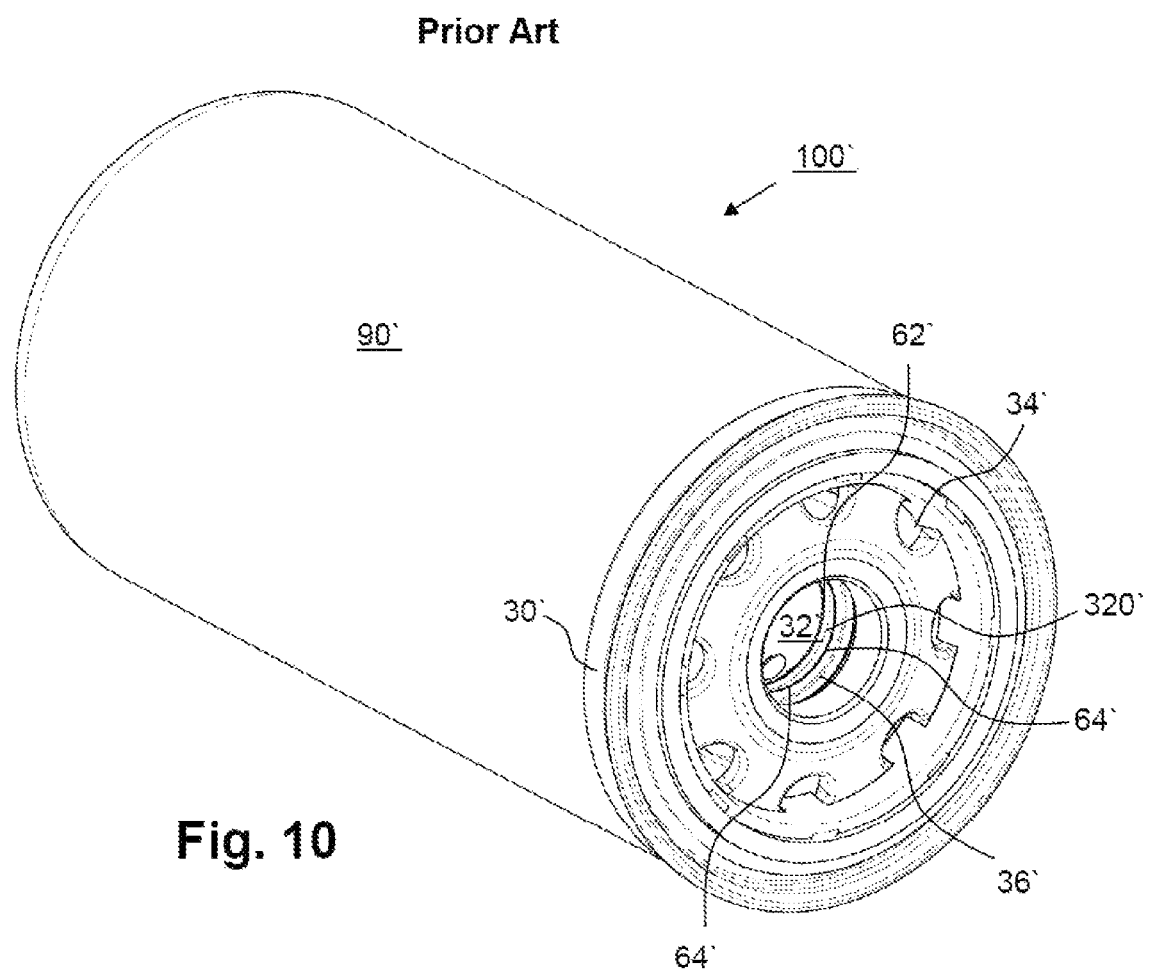
FIG. 10 shows in isometric illustration the conventional separating element of FIG. 8.

LIST OF REFERENCE CHARACTERS 10 first filter element or first filter medium of the separating element, in particular embodied as an annular coalescing element, in particular glass fiber wound multiple times; compare FIGS. 1, 3, and 6
10' first filter medium of the separating element of the prior art embodied in particular as an annular coalescing element; compare FIGS. 8 and 9
20 further filter element or further filter medium of the separating element that is embodied in particular as an annular coalescing element, in particular nonwoven; compare FIGS. 1, 3, and 6
20' further filter medium of the separating element of the prior art, embodied in particular as an annular coalescing element; compare FIGS. 8 and 9
24 element interior of the filter element 10, 20; compare FIGS. 1, 3, and 6
30 housing cover or threaded plate or threaded cover or bottom plate of the separating device 300; compare FIGS. 1, 3, 6, and 7
30' housing cover or threaded plate or threaded cover or bottom plate of the separating device 300' of the prior art; compare FIGS. 8, 9, and 10
32 first gas passage, in particular clean air outlet, of the housing cover 30; compare FIG. 7
32' first gas passage of the housing cover 30' of the prior art; compare FIG. 10
34 second gas passage, in particular raw air inlet, for example, raw-side inlet opening, of the housing cover 30; compare FIGS. 3, 6, and 7
34' second gas passage of the housing cover 30' of the prior art; compare FIGS. 9 and 10

36 thread, in particular inner thread, of the housing cover 30; compare FIGS. 1, 3, 6, and 7
36' thread, in particular inner thread, of the housing cover 30' of the prior art; compare FIGS. 8, 9, and 10
37 profile height or thread height of the housing cover thread 36 of the housing 90 of the present invention; compare FIG. 6
37' profile height of the housing cover thread 36' of the housing 90' of the prior art; compare FIG. 9
40 mounting axis of the separating element 100, in particular longitudinal axis of the housing 90, for example, longitudinal axis of the separating element 100, at the connector device; compare FIGS. 1, 3, and 6
40' mounting axis of the separating element 100', in particular longitudinal axis of the housing 90', for example, longitudinal axis of the housing 90', of the prior art; compare FIGS. 8 and 9
50 first end disk of the separating element 10, 20 facing the housing cover 30 and in particular arranged at the lower end or at the bottom, for example, first element bottom of the separating element 10, 20; compare FIGS. 1, 3, and 6
50' first end disk of the separating element 10', 20' of the prior art facing the housing cover 30', in particular arranged at the lower end or at the bottom end; compare FIGS. 8 and 9
52 further end disk of the separating element 10, 20 facing away from the housing cover 30, in particular arranged at the end face or at the top, for example, further element bottom of the separating element 10, 20; compare FIGS. 1 and 6
52' further end disk of the separating element 10', 20' of the prior art facing away from the housing cover 30', in particular arranged at the end face or at the top; compare FIGS. 8 and 9
54 annular groove of the first end disk 50; compare FIGS. 1, 3, and 6
54' annular groove of the first end disk 50'; compare FIGS. 8 and 9
60 mounting opening or through opening of the first end disk 50; compare FIG. 6
60' mounting opening or through opening of the first end disk 50' of the prior art; compare FIG. 9
62 inner rim area, in particular stay element or collar, for example, supporting contour embodied for supporting the coupling element 200 during mounting. of the through opening 60 of the first end disk 50; compare FIGS. 1, 2, 3, 6, and 7
62' inner rim area, in particular stay element or collar, for example, supporting contour of the first end disk 50' of the prior art for supporting the coupling element 200 during mounting; compare FIGS. 8, 9 and 10
64 further stay element or further collar of the first end disk 50 of the housing 90 of the present invention; compare FIGS. 1, 2, 3, and 7
64' further stay element or further collar of the first end disk 50 of the housing 90' of the prior art; compare FIGS. 8, 9, and 10
66 fluid retaining chamber, in particular liquid retaining chamber or liquid collecting chamber of the housing 90 of the present invention; compare FIGS. 1 and 3
66' fluid retaining chamber of the housing 90' of the prior art; compare FIGS. 8 and 9
80 sealing and damping element, in particular sealing and damping ring, of the housing 90 of the present invention; compare FIGS. 1, 3, and 6
80' damping element, in particular damping ring, of the housing 90' of the prior art; compare FIGS. 8 and 9
90 housing, in particular cup-shaped or hood-shaped or circular cylindrical housing, of the separating element 100; compare FIGS. 1, 3, 6, and 7
90' housing of the separating element 100' of the prior art; compare FIGS. 8, 9, and 10
92 spring of the separating element 100 of the present invention embodied for tolerance compensation; compare FIG. 1
92' spring of the separating element 100' of the prior art embodied for tolerance compensation; compare FIG. 8
100 separating element, in particular air/oil separator box; compare FIGS. 6 and 7
100' separating element of the prior art; compare FIGS. 9 and 10
200 coupling element, in particular coupling nipple or coupling pipe socket, for example, nipple; compare FIGS. 4 and 5
200' coupling element, in particular coupling nipple or coupling pipe socket, of the prior art; compare FIG. 8
210 gas-conducting interior of the coupling element 200, in particular tubular clean fluid outlet or clean fluid outlet pipe of the coupling element 200; compare FIGS. 1, 3, 4, and 5
210' gas-conducting interior, in particular tubular clean fluid outlet or clean fluid outlet pipe, of the coupling element 200' of the prior art; compare FIG. 8
220 fluid discharge channel, in particular liquid discharge channel, for discharging the separated fluid from the separating device 300, in particular from the separating element 100, in particular gap between clean fluid outlet pipe 210 and radially outer circumferential side 230 of the coupling element 200; compare FIGS. 1, 3, 4, and 5
220' fluid discharge channel of the prior art; compare FIG. 8
230 radially outer circumferential side of the coupling element 200, compare FIGS. 1, 3, 4, and 5
230' radially outer circumferential side of the coupling element 200' of the prior art; compare FIG. 8
232 thread of the coupling element 200; compare FIGS. 1, 3, and 4
232' thread of the coupling element 200' of the prior art; compare FIG. 8
240 sealing surface of the radially outer circumferential side 230 of the coupling element 200 of the present invention; compare FIGS. 4 and 5
240' sealing surface of the radially outer circumferential side 230' of the coupling element 200' of the prior art; compare FIG. 8
272 spacing between the circumferential wall 230 of the coupling element 200, which, in the position of use of the separating device 300, is arranged in the first gas passage 32 and is positioned radially outwardly in relation to the mounting axis 40, relative to the rim area of the first gas passage 32, which is radially inwardly positioned in relation to the mounting axis 40, in particular spacing between the radially outer circumferential wall of the gas-conducting interior 210 of the coupling element 200 that is arranged in the through opening 60 and the radially inner rim area 62 of the first end disk 50, for example, the gap of the through opening 60 arranged between the first end disk 50 and the coupling element 200; compare FIG. 2
300 separating device for separating at least one fluid, in particular of oil, from gas, in particular from air, in particular air/oil separator box or air/oil separator element; compare FIGS. 1 and 3

300' separating device for separating at least one fluid, in particular of oil, from gas, in particular from air, in particular air/oil separator box or air/oil separator element of the prior art; compare FIG. 8

320' sealing ring for sealing the raw side of the air/oil separator box relative to the clean side of the air/oil separator box 100' of the prior art, in particular O-ring for sealing the first end disk 50' of the separating element relative to the coupling element 200'; compare FIGS. 8 and 9

400 connector device or connector element, in particular compressor, compressed air device, or vacuum pump; compare FIG. 3

410 connector head, in particular filter head, of the connector element 400; compare FIG. 3

What is claimed is:

1. A separating element comprising:
   a housing comprising
      a housing cover closing off an end face of the housing;
   at least one filter element arranged in the housing and configured to separate a liquid from a gas;
   wherein the housing cover comprises at least one first gas passage formed as a through opening and arranged centrally in the housing cover in relation to a mounting axis of the separating element;
   wherein the housing cover comprises a housing cover thread correlated with the at least one first gas passage,
   wherein the housing cover thread is configured to screw onto a coupling element thread of a coupling element configured to couple the separating element with a connector device;
   wherein the housing cover comprises
      at least one second gas passage that, relative to the mounting axis of the separating element, is arranged radially outwardly of the at least one first gas passage;
   wherein the at least one first gas passage and the at least one second gas passage are the only openings of the housing cover and, except for the at least one first gas passage and the at least one second gas passage, the housing cover is completely closed;
   wherein the housing cover thread is configured to substantially seal-tightly engage the coupling element thread;
   wherein the filter element comprises an end face which, in relation to the mounting axis of the separating element, extends radially and faces the housing cover,
   wherein the filter element comprises an end disk disposed on the end face of the at least one filter element;
   wherein the end disk comprises:
      a radially outer first annular portion arranged on the end face of the filter element;
      a circular radially inner rim of the end disk arranged radially inwardly and surrounding the at least one first gas passage of the housing cover;
   a coupling element formed as a coupling nipple having a first axial end and an opposite second axial end, a radially outer circumferential wall of the coupling element, in a position of use of the coupling element, extends through the at least one first gas passage, the coupling nipple comprising:
      a coupling socket having a radially outer thread, the coupling socket extending through the housing cover at least one first gas passage, the radially outer thread screwed onto and engaging the housing cover thread;
   wherein the radially inner rim of the end disk forms:
      a first radially projecting collar projecting radially inwardly towards a radially outer side of the coupling nipple;
      a second radially projecting collar axially spaced part from the first radially projecting collar and a projecting radially inwardly towards a radially outer side of the coupling nipple,
      wherein a coaxial gap is formed between the radially outer side of the coupling nipple and both of the first and the second radially projecting collars;
   wherein the end disk further forms an annular fluid chamber formed as an annular "V" or "U" cross section having two axially projecting legs of the "V" or "U" cross section and formed into the end disk, circumferentially surrounding the central opening of the housing cover, an axially outer tip of the annular "V" or "U" cross section of the annular fluid chamber projecting axially outwardly beyond the axial end face of the filter element to form a outer closed bottom wall of the of the annular fluid chamber, the radially inner and radially outer walls of the annular fluid retaining chamber projecting axially inwardly from the closed bottom wall and axially inwardly beyond the axial end face of the filter element into the interior of the filter element;
   wherein a radial inner leg of the annular "V" or "U" cross section form an axially extending annular circular inner rim surrounding the through opening and extending in a radial direction relative to the mounting axis of the separating element.

2. The separating element according to claim 1, wherein the at least one first gas passage of the housing cover is cylinder-shaped and
   the housing cover thread comprises
      at least one thread turn that winds continuously in a helix shape about a jacket of the at least one first gas passage and is completely closed so as to have no cuts and no interruptions.

3. The separating element according to claim 1, wherein a screw-in depth of the housing cover thread amounts to at least one third of a diameter of the at least one first gas passage.

4. The separating element according to claim 1, wherein the housing cover thread is embodied to meet at least the tolerance class medium (m) according to DIN ISO 965-1.

5. The separating element according to claim 1, wherein the end disk is configured such that the end disk and the coupling element are spaced apart and without contact in a position of use of the separating element.

6. The separating element according to claim 5, wherein a diameter of the circular inner rim area is selected such that the end disk and the coupling element are without contact in the position of use of the separating element.

7. The separating element according to claim 1, wherein the fluid retaining chamber is configured to throttle, retain, or collect the liquid that has been separated by the filter element from the gas and that flows into the through opening.

8. The separating element according to claim 1, wherein the circular inner rim area of the end disk comprises
   at least one first stay element surrounding the through opening and extending, in relation to the mounting axis of the separating element, in a radial direction inwardly,
   wherein the at least one stay element surrounds a circular opening, wherein the end disk comprises at least one second stay element surrounding the through opening and extending, in relation to the mounting axis of the separating element, in the radial direction inwardly, wherein the at least one first stay element and the at least one second stay element are arranged on the radial inner leg of the annular "V" or "U" cross section, the at least one first stay element and the at least one second stay element axially displaced relative to each other in an axial direction of the mounting axis of the separating element such that, in the position of use of the separating element, the at least one first stay element and the at least one second stay element axially delimit a second fluid retaining chamber formed between the at least one first stay element and the at least one second stay element, wherein the second fluid retaining chamber is configured to throttle, retain, or collect the liquid that has been separated by the filter element from the gas and that flows into the through opening.

9. The separating element according to claim 8, wherein the at least one first stay element and the at least one second stay element are configured to interact in the manner of a labyrinth seal with the coupling element, extending through the through opening in a position of use of the separating element, in such a way that a gap of the through opening arranged between the end disk and the coupling element is substantially fluid-impermeable and/or substantially liquid-impermeable.

10. The separating element according to claim 1, further comprising at least one sealing and damping element that is seal-tightly compressed between the end disk and an inner side of the housing cover facing an interior of the housing, wherein the sealing and damping element is configured to seal a clean side of the separating element from a raw side of the housing containing unpurified fluid and configured to dampen axially oriented vibrations of the filter element occurring in an axial direction of the mounting axis of the separating element.

11. The separating element according to claim 10, wherein an axial extension of the sealing and damping element amounts to at least one millimeter in the axial direction of the mounting axis of the separating element.

12. The separating element according to claim 10, wherein the sealing and damping element is comprised of at least one material that exhibits a temperature resistance of more than 100 degrees Celsius and a long-term oil resistance according to DIN EN 60811-2-1.

* * * * *